(12) United States Patent
Mizutani

(10) Patent No.: US 7,129,972 B2
(45) Date of Patent: Oct. 31, 2006

(54) IMAGE SENSING DEVICE FOR TRANSMITTING IMAGES

(75) Inventor: Koichi Mizutani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 531 days.

(21) Appl. No.: 09/956,023

(22) Filed: Sep. 20, 2001

(65) Prior Publication Data

US 2002/0036698 A1    Mar. 28, 2002

(30) Foreign Application Priority Data

Sep. 25, 2000    (JP)    ............................ 2000-291163

(51) Int. Cl.
H04N 5/225    (2006.01)
H04N 5/232    (2006.01)

(52) U.S. Cl. ................................ 348/211.2; 348/207.1

(58) Field of Classification Search .......... 348/207.99, 348/207.1, 207.11, 211.99, 211.1, 211.2, 348/211.3, 231.2, 231.9

See application file for complete search history.

(56) References Cited

U.S. PATENT DOCUMENTS

| | | | |
|---|---|---|---|
| 5,806,005 A * | 9/1998 | Hull et al. ................... | 455/566 |
| 5,943,603 A * | 8/1999 | Parulski et al. .............. | 725/133 |
| 6,288,800 B1 | 9/2001 | Izumi .......................... | 358/468 |
| 6,392,697 B1 | 5/2002 | Tanaka et al. | |
| 6,608,563 B1 * | 8/2003 | Weston et al. ............ | 340/573.1 |
| 6,636,259 B1 * | 10/2003 | Anderson et al. ........ | 348/211.3 |
| 6,642,959 B1 * | 11/2003 | Arai .......................... | 348/231.3 |
| 6,715,003 B1 * | 3/2004 | Safai ............................ | 710/33 |
| 6,741,271 B1 * | 5/2004 | McConica et al. .......... | 345/839 |
| 6,930,709 B1 * | 8/2005 | Creamer et al. .......... | 348/211.3 |
| 2002/0060740 A1 * | 5/2002 | Kato ........................... | 348/232 |

FOREIGN PATENT DOCUMENTS

| | | |
|---|---|---|
| EP | 0 833 494 A2 | 4/1998 |
| EP | 0 889 635 A2 | 1/1999 |
| EP | 0 930 770 A2 | 7/1999 |
| GB | 2 336 060 | 10/1999 |
| JP | 10-065889 | 8/1996 |
| JP | 10-224591 | 8/1998 |
| JP | 11-225238 | 9/1998 |
| JP | 10-308981 | 11/1998 |
| JP | 11-284894 | 10/1999 |
| JP | 11-341302 | 12/1999 |
| WO | WO 00/33562 | 6/2000 |

OTHER PUBLICATIONS

RFC 821: Simple Mail Transport Protocol, J. Postel, Aug. 1982.*
Patent Abstracts of Japan, Public. No. 10215397, vol. 1998, No. 13, Nov. 8, 1998 (Application No. 09017247).

* cited by examiner

*Primary Examiner*—Vivek Srivastava
*Assistant Examiner*—Timothy J. Henn
(74) *Attorney, Agent, or Firm*—Fitzpatrick, Cella, Harper & Scinto

(57) ABSTRACT

An image sensing device and communication device are connected via a wireless channel, and the image sensing device selects a destination of image data based on destination information received from the communication device and sends image data and destination data to the communication device. The communication device establishes connection to the destination using the destination data received from the image sensing device, and sends the image data to the destination.

32 Claims, 11 Drawing Sheets

FIG. 5

| ADDRESS | DATA |
|---|---|
| 0 | 0337571234 |
| 1 | 0354827234 |
| 2 | 0441234567 |
| 3 | 070512345678 |
| 8 | 0(NUMBER AT ADDRESS 0) |
| 40 | ¥MyDocuments¥IMAGE¥CLASS1 |
| 41 | ¥MyDocuments¥IMAGE¥CLASS2 |
| 42 | ¥MyDocuments¥IMAGE¥CLASS3 |
| 43 | ¥MyDocuments¥IMAGE¥CLASS4 |
| 48 | 0(LOCATION AT ADDRESS 40) |
| 80 | IMAGE_0.jpg |
| 81 | IMAGE_1.jpg |
| 82 | IMAGE_2.jpg |
| 83 | IMAGE_3.jpg |
| 88 | 00:LATEST IMAGE<br>10:IMAGE AT ADDRESS 80 |

354
354a
354b
354c

IMAGE SENSING DEVICE FOR TRANSMITTING IMAGES

FIELD OF THE INVENTION

The present invention relates to an image sensing device.

BACKGROUND OF THE INVENTION

When transmitting an image sensed by a digital camera, the image data is temporarily transferred from the digital camera to, e.g., a personal computer, and the transferred image data is transmitted to a desired address by an image transmission function of the personal computer.

However, the aforementioned communication sequence cannot exploit the real time characteristic of the digital camera.

SUMMARY OF THE INVENTION

It is an object of the present invention to provide an image sensing device which can easily send sensed image data to a desired destination.

It is another object of the present invention to provide an image sensing device which can designate the storage location of image data at the destination, and allows easy classification and search of received images at the receiving side.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is an allocation table of a destination information storage means, image saving location information storage means, and transmission image designation information storage means provided to the communication device shown in FIG. 2;

DETAILED DESCRIPTION OF THE PREFERRED EMBODIMENTS

Figure 1:
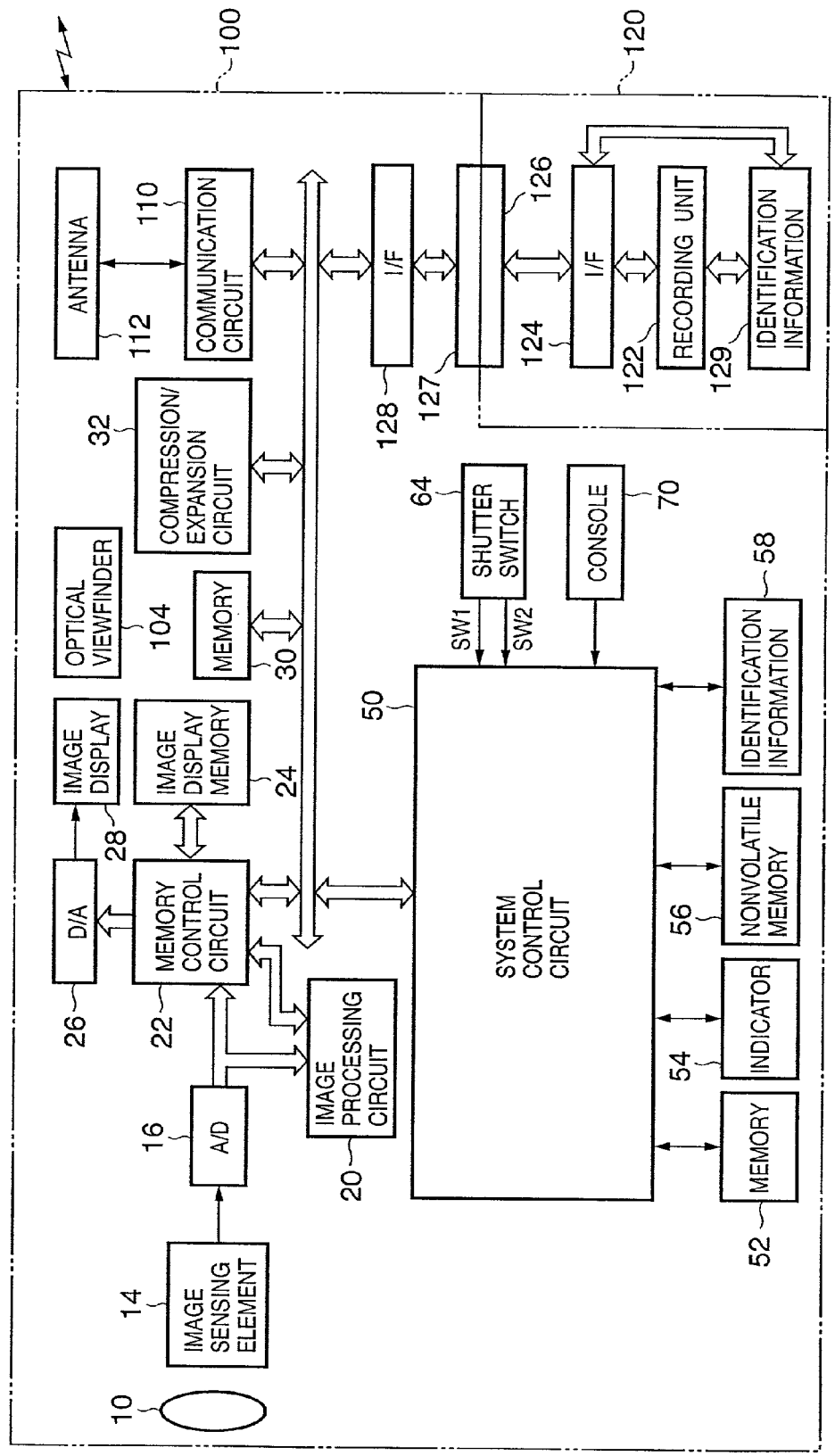
FIG. 1 is a block diagram of an arrangement of an image sensing device in an image communication system according to an embodiment of the present invention.
Figure 2:
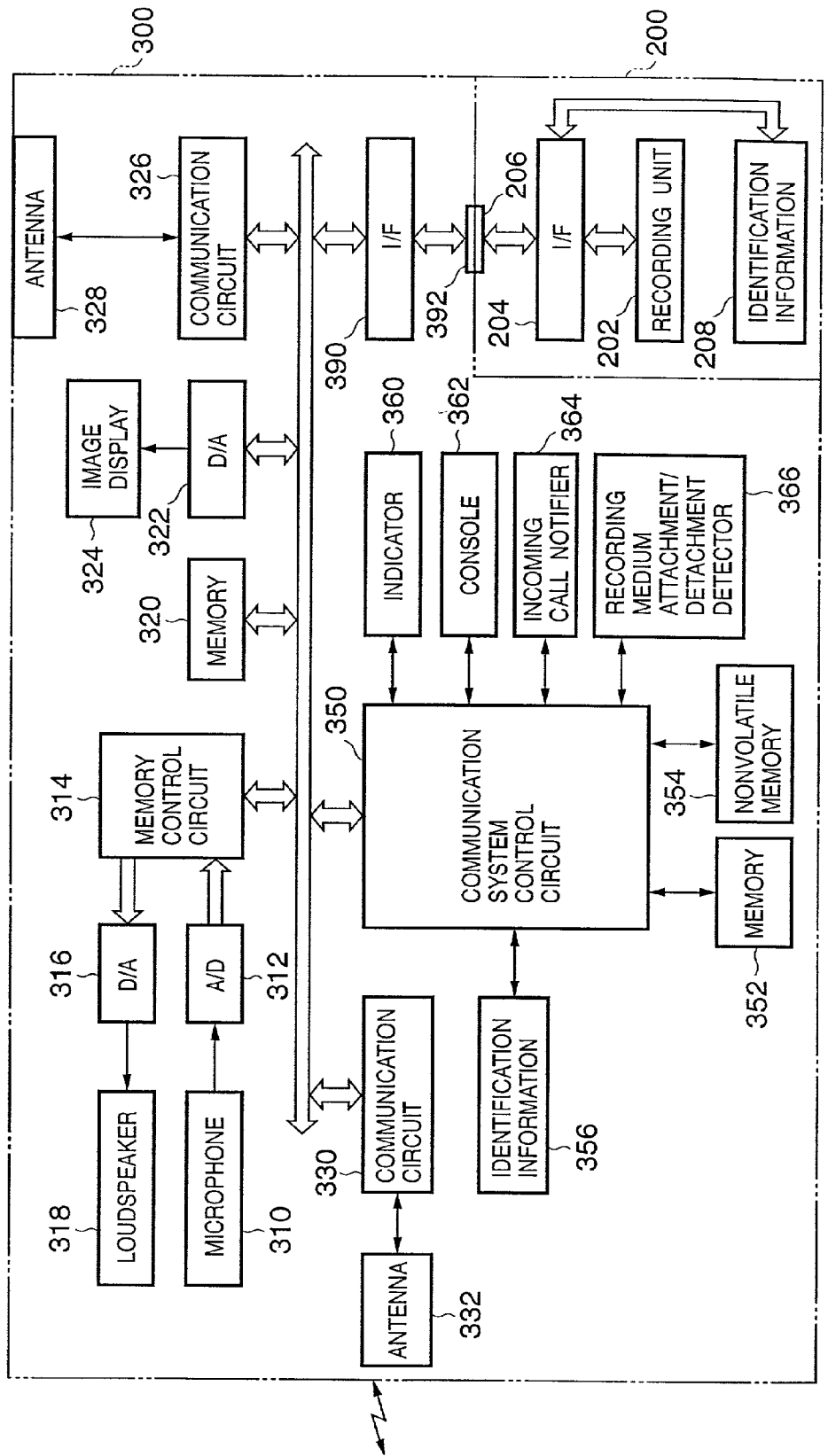
FIG. 2 is a block diagram of an arrangement of a communication device in the image communication system according to the embodiment of the present invention.
Figure 3:
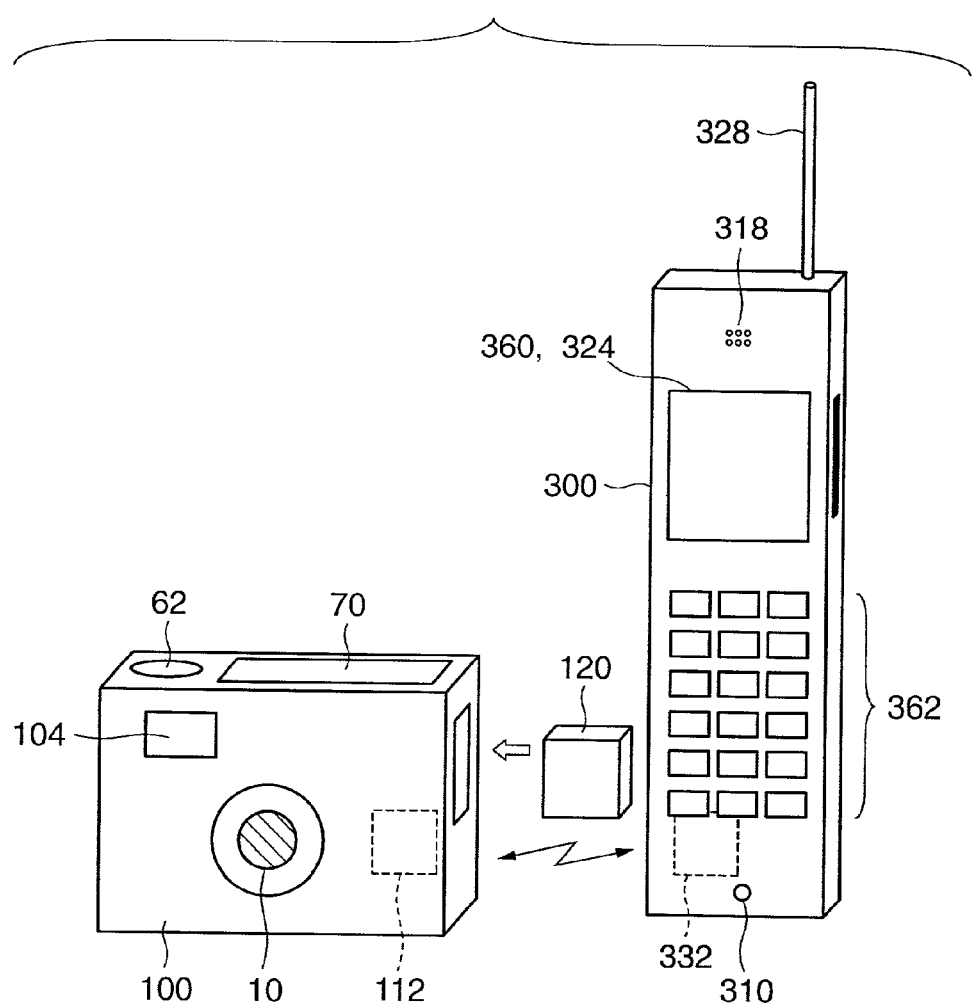
FIG. 3 is a perspective view showing an outer appearance of the image communication system built by the image sensing device shown in FIG. 1 and the communication device shown in FIG. 2.
Figure 4:
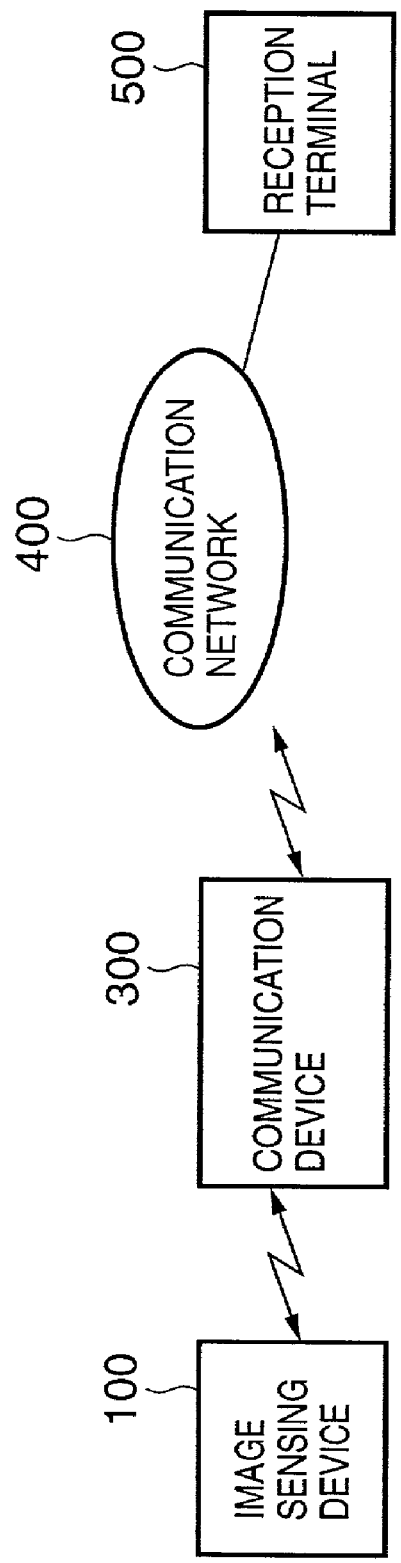
FIG. 4 is a block diagram of an overall arrangement of the image communication system built by the image sensing device shown in FIG. 1 and the communication device shown in FIG. 2.

FIG. 1 is a block diagram showing an arrangement of an image sensing device, FIG. 2 is a block diagram showing an arrangement of a communication device, FIG. 3 is a perspective view showing an outer appearance of an image communication system built by the image sensing device in FIG. 1 and the communication device in FIG. 2, and FIG. 4 is a block diagram showing an overall arrangement of the image communication system built by the image sensing device in FIG. 1 and the communication device in FIG. 2.

As shown in FIG. 4, an image communication system is built by an image sensing device 100 and communication device 300, which are connected via a wireless channel. The communication device 300 is connected to a communication network 400, and an image sensed by the image sensing device 100 can be sent to a reception terminal 500 via the communication network 400.

More specifically, as shown in FIG. 3, the image sensing device 100 exchanges data containing commands and a sensed image via antennas 112 and 332, respectively located in each device. Wireless communication between the image sensing device 100 and communication device 300 is attained by a spread spectrum scheme such as Bluetooth. Bluetooth is a wireless communication scheme which uses the 2.4-GHz frequency band, requires little electric power, and is suitable for near-distance communications, and can obtain a high transmission rate ranging from 500 kbps to 1 Mbps. Note that an infrared communication scheme such as IrDA may be used in place of that wireless communication scheme.

The image sensing device 100 stores image data sensed via a photographing lens 10 on a recording medium 120, and sends the image data via the antenna 112.

The communication device 300 receives image data via the antenna 332, and sends the received image data by an antenna 328 to the reception terminal 500 via a communication base station accommodated in the communication network 400, and the communication network 400.

The arrangement of the image sensing device 100 will be described in detail below.

The image sensing device 100 (refer to FIG. 1) is a digital camera.

The photographing lens 10 comprises an optical lens group for capturing an optical image of an object. An image sensing element 14 converts an optical image captured via the photographing lens 10 into electrical signals, and an A/D converter 16 converts the analog signal output from the image sensing element 14 into a digital signal and outputs the digital signal as image data.

An image processing circuit 20 executes a predetermined pixel interpolation process and color conversion process for image data from the A/D converter 16 or a memory control circuit 22.

Image data from the A/D converter 16 is written in an image display memory 24 or memory 30 via the image processing circuit 20 and memory control circuit 22 or directly via the memory control circuit 22. An image display 28 comprises a TFT LCD (TFT liquid crystal display panel) or the like. Display image data written in the image display memory 24 is converted by a D/A converter 26 into an analog video signal, which is inputted to and displayed by the image display 28. When sensed image data is displayed using the image display 28, a digital viewfinder function can be implemented.

The memory 30 comprises a volatile memory and/or nonvolatile memory for storing sensed still image and moving image data, and has a storage capacity large enough to store a predetermined number of still images or a moving image for a predetermined period of time. The memory 30 is also used as a work area of a system control circuit 50.

A compression/expansion circuit 32 compresses/expands image data by, e.g., adaptive discrete cosine transform (ADCT). The circuit 32 compresses/expands an image read from the memory 30, and writes the compressed/expanded data in the memory 30.

The system control circuit 50 controls the overall image sensing device 100. A memory 52 stores constants, variables, programs, and the like required for operating the system control circuit 50. An indicator 54 comprises a liquid crystal display, speaker, and the like for displaying the operation state, messages, and the like using text, icons, sound, and the like in accordance with execution of programs by the system control circuit 50, and is constructed by one or a plurality of elements which are set at easy-to-see positions around a console 70 of the image sensing device 100, and include a combination of an LCD, LEDs, sound generation element, and the like. Some of the displayed information shown in indicator 54 are shown in an optical viewfinder 104.

A nonvolatile memory 56 is an electrically erasable/recordable memory, and uses, e.g., an EEPROM or the like. Identification information 58 stores various kinds of identification information used in authentication prior to communicating with the communication device 300 via a communication circuit 110 and the antenna 112.

Shutter switch 64 and the console 70 are used to input various operation instructions of the system control circuit 50, and comprise a combination of one or a plurality of switches, dials, a touch panel, pointing by means of line-of-sight detection, a speech recognition device, and the like.

The shutter switch 64 is turned ON when a shutter button 62 (FIG. 3) is pressed to its full-stroke position, and instructs start of a series of processes including an exposure process for writing a signal read from the image sensing element 14 in the memory 30 as image data via the A/D converter 16 and memory control circuit 22, a development process using arithmetic operations by the image processing circuit 20 and memory control circuit 22, and a recording process for compressing image data read out from the memory 30 by the compression/expansion circuit 32, and writing the compressed image data in the recording medium 120.

The console 70 comprises various buttons, a touch panel, and the like, which include a power switch, menu button, set button, menu move + (plus) button, menu move − (minus) button, playback image move + (plus) button, a playback image move − (minus) button, a playback switch capable of setting various function modes such as a playback mode/minus screen playback·erase mode/PC connect mode, and the like, and so on. In place of the plus and minus buttons, a rotary dial switch may be used to select numerical values and functions.

The optical viewfinder 104 allows photographing without using the digital viewfinder function by means of the image display 28.

The communication circuit 110 has a near-distance, high-speed data communication function based on a spread spectrum communication scheme such as Bluetooth or the like.

An interface 128 interfaces with the recording medium 120 such as a memory card, hard disk, or the like, and a connector 127 connects the recording medium 120.

Note that this embodiment has one set of interface and connector that receive the recording media. Alternatively, a plurality of sets of interfaces and connectors may be used. Also, combinations of interfaces and connectors of different standards may be used.

As the interface and connector, those complying with the standards of a PCMCIA (Personal Computer Memory Card International Association) card, CF (compact flash) card, MMC (multimedia card), and the like may be used.

Furthermore, when the interface 128 and connector 127 comply with the standards of a PCMCIA card, CF card, and the like, and various communication cards such as a LAN card, modem card, USB card, IEEE (Institute of Electrical and Electronic Engineers) 1394 card, P1284 card, SCSI (Small Computer System Interface) card, PHS, and the like are connected thereto, image data and associated management information can be transferred between the image sensing device and an external computer or its peripheral devices such as a printer and the like.

The recording medium 120 comprises a recording unit 122 comprised of a semiconductor memory, magnetic disk, or the like, an interface 124 with the image sensing device 100, a connector 126 for connecting the image sensing device 100, and identification information 129.

The detailed structure of the communication device 300 will be explained below using FIG. 2.

The communication device 300 is a portable telephone.

Microphone 310 converts a voice into an electrical signal, and an A/D converter 312 converts an analog signal outputted from the microphone 310 into a digital signal and outputs the digital signal as audio data. Memory control circuit 314 controls read/write of audio data from the A/D converter 312 from/in a memory 320, and also input of data read out from the memory 320 to a D/A converter 316. The D/A converter 316 converts audio data into an analog signal, and inputs the analog signal to a speaker 318. The speaker 318 converts the input analog signal into a voice signal, and outputs voice.

The memory 320 stores audio data input via the microphone 310, and a still image or moving image sent from the image sensing device 100, and has a storage size large enough to store a predetermined number of still images or a moving image for a predetermined period of time. D/A converter 322 converts still image data or moving image data stored in the memory 320 into an analog signal, and outputs the analog signal to an image display 324 as an image signal. The image display 324 displays an image signal from the D/A converter 322.

Communication circuit 326 has a far-distance wireless communication function such as TDMA (Time Division Multiple Access), CDMA (Code Division Multiple Access), W-CDMA (Wide-band Code Division Multiple Access), or the like, and connects the communication device 300 to another communication device and/or communication base station via the antenna 328 and a wireless channel.

Communication circuit 330 has a near-distance, high-speed data communication function based on the Bluetooth spread spectrum communication, and connects the communication device 300 with another device via the antenna 332.

Communication system control circuit 350 controls the overall communication device 300. Memory 352 stores constants, variables, programs, and the like required for operating the communication system control circuit 350. The nonvolatile memory 354 is an electrically erasable memory, and uses, e.g., an EEPROM or the like.

Identification information 356 stores various kinds of identification information used for authentication prior to communication with the image sensing device 100 via the communication circuit 330 and antenna 332. Indicator 360 comprises a liquid crystal display, speaker, and the like for displaying the operation state, messages, and the like using text, icons, sound, and the like in accordance with execution of programs by the communication system control circuit 350, and is constructed by one or a plurality of elements which are set at easy-to-see positions around a console 362 of the communication device 300, and include a combination of an LCD, LEDs, sound generation element, and the like.

The console 362 is used to input various operation instructions of the communication system control circuit 350, and comprises a combination of one or a plurality of switches, dials, a touch panel, pointing by means of line-of-sight detection, a speech recognition device, and the like. The console 362 allows operations such as power ON/OFF of the communication device 300, execution (off-hook)/stop (on-hook) of telephone conversation, telephone number input, telephone number search, switching of communication modes, and the like.

Incoming call notifier 364 notifies the user of the communication device 300 of an incoming call by a sound such as a ringing tone, voice, music, or the like and/or an image such as an icon, moving image, still image, light emission, or the like and/or vibration. Recording medium attachment/detachment detector 366 detects whether or not a recording medium 200 is attached to a connector 392.

Interface 390 interfaces with the recording medium 200 such as a memory card, hard disk, or the like, and the connector 392 connects the recording medium 200.

Note that this embodiment has one set of interface and connector that receive the recording media. Alternatively, a plurality of sets of interfaces and connectors may be used. Also, combinations of interfaces and connectors of different standards may be used.

As the interface and connector, those complying with the standards of a PCMCIA (Personal Computer Memory Card International Association) card, CF (compact flash) card, MMC (multimedia card), and the like may be used. Furthermore, when the interface 390 and connector 392 use those complying with the standards of a PCMCIA card, CF card, and the like, and various communication cards such as a LAN card, modem card, USB card, IEEE (Institute of Electrical and Electronic Engineers) 1394 card, P1284 card, SCSI (Small Computer System Interface) card, PHS, and the like are connected thereto, image data and associated management information can be transferred between the image sensing device and an external computer or its peripheral devices such as a printer and the like.

The recording medium 200 comprises a recording unit 202 comprised of a semiconductor memory, magnetic disk, or the like, an interface 204 with the communication device 300, a connector 206 for connecting the image sensing device 100, and identification information 208.

FIG. 5 shows a storage allocation of the nonvolatile memory 354.

Referring to FIG. 5, an area 354a stores at addresses "0" to "3" as destination information telephone numbers of image communication partners, and also at address "8" information for designating a destination in a default mode. If "0" is stored at address "8", the destination in the default mode is fixed to that stored at address "0". If "1" is stored at address "8", the destination in the default mode is fixed to that stored at address "1".

An area 354b stores at addresses "40" to "43" image saving location information for designating a location where the communication partner (reception terminal 500 in FIG. 4) saves a received image, and also at address "48" information for designating an image saving location in the default mode. If "0" is stored at address "48", the storage location in the default mode is fixed to that stored at address "40". If "1" is stored at address "48", the storage location in the default mode is fixed to that stored at address "41".

An area 354c stores, e.g., file names at addresses "80" to "83" as transmission image designation information for designating the image to be sent, and also at address "88" information for designating a transmission image in the default mode. If "00" or "10" is stored at address "88", the transmission image is fixed. If "00" is stored at address "88", the transmission image is fixed to a latest sensed image; if "10" is stored at address "88", the transmission image is fixed to an image at address "80" (in this case, an image_0.jpg stored at address "80").

The contents of these storage areas can be rewritten to arbitrarily values by operations at the console 362 of the communication device 300.

This embodiment can execute an image transmission mode for sending image data which is designated by the transmission image designation information from those sensed by the image sensing device 100 to the destination designated by the destination information via the communication device 300, and designating the saving location of the sent image data by the image saving location information.

Also, this embodiment has a mode for receiving image data sent from the image sensing device 100 by the communication device 300 and recording the received image data in the detachable recording medium 200.

The processing sequence for executing the image transmission mode will be described below with reference to FIGS. 6 to 10.

Figure 6:
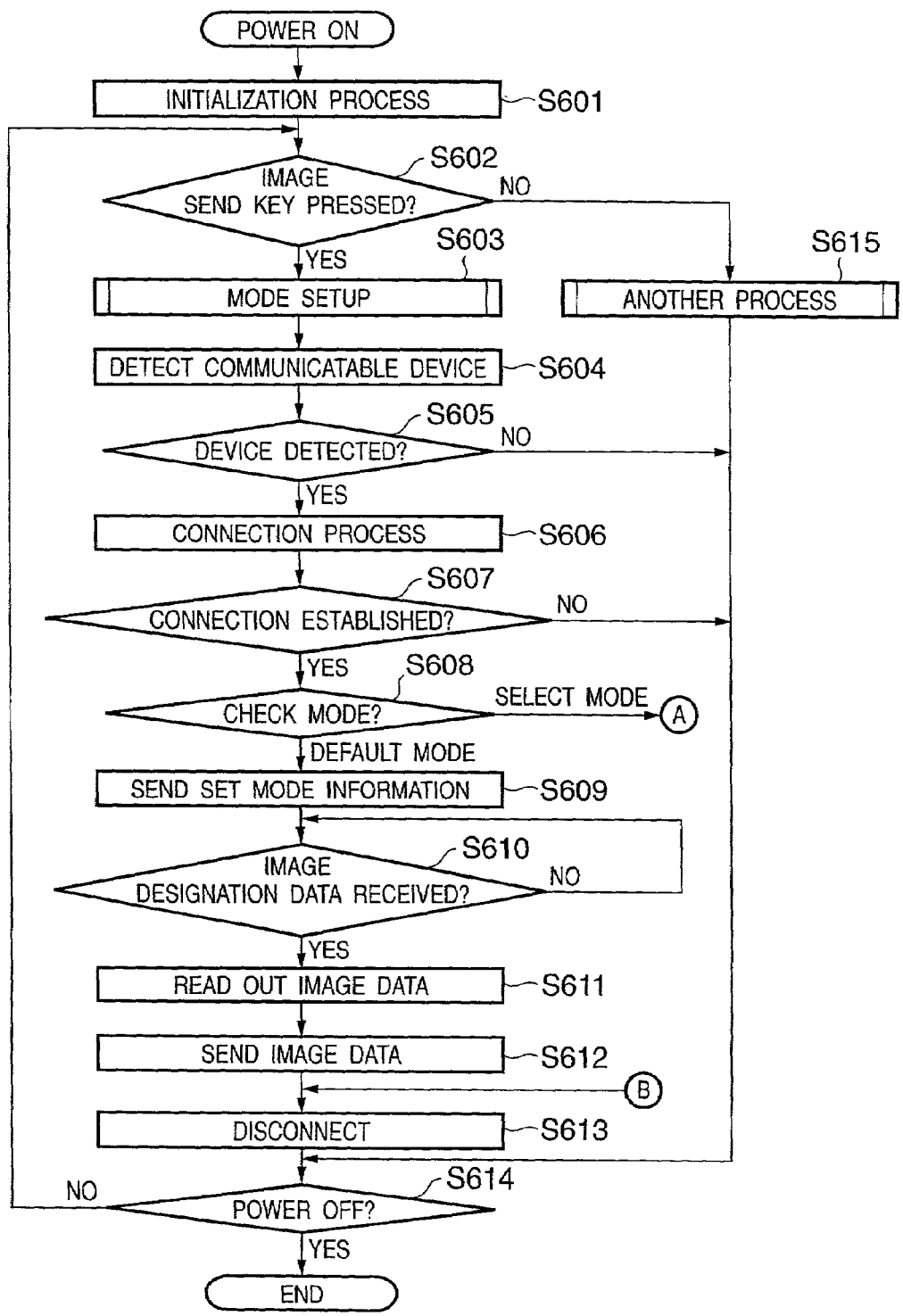
FIG. 6 is a flowchart showing the operation sequence in the image sensing device shown in FIG. 1.
Figure 7:
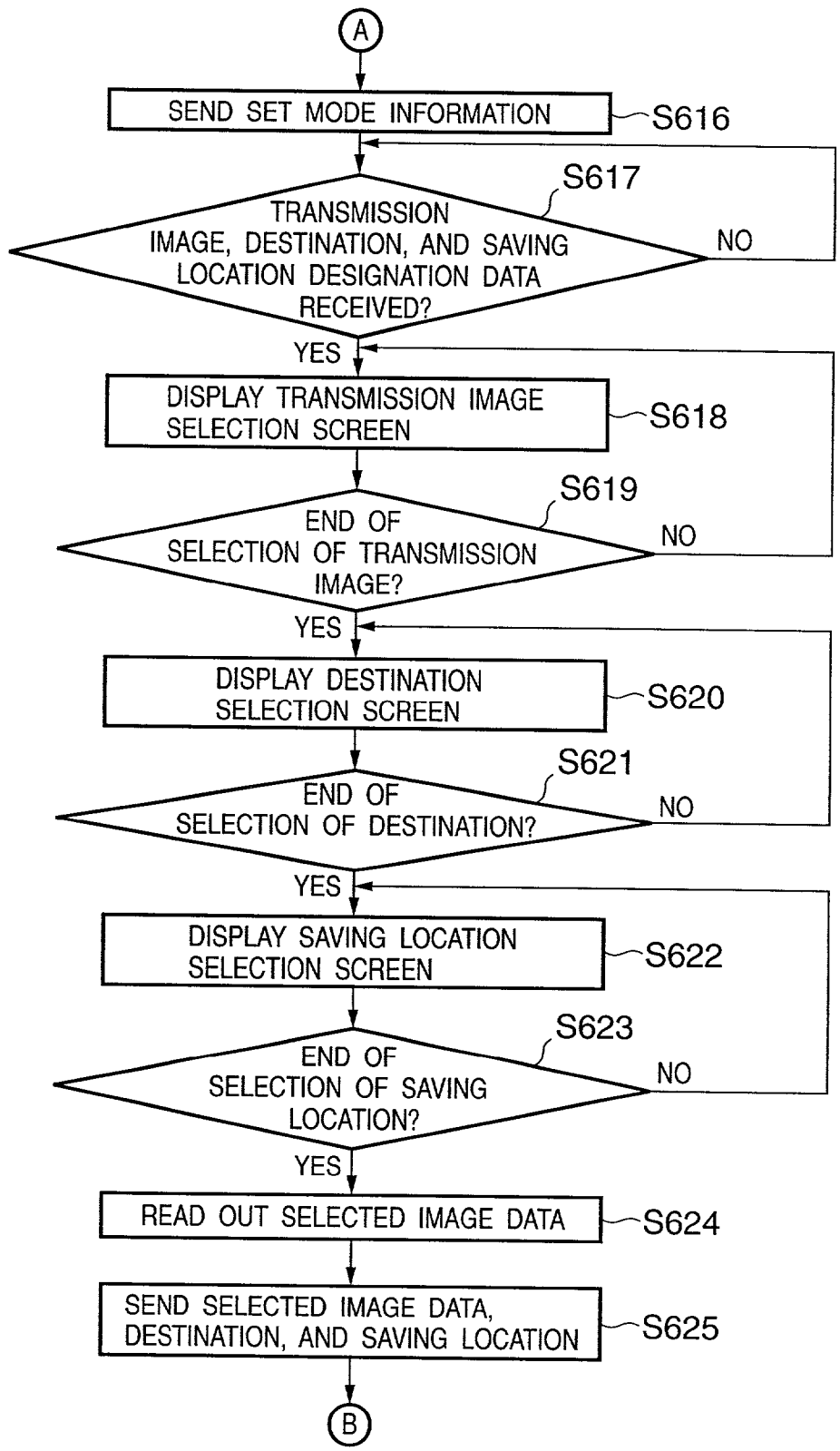
FIG. 7 is a flowchart showing the operation sequence in the image sensing device shown in FIG. 1.

FIGS. 6 and 7 are flowcharts showing the operation sequence of the image sensing device shown in FIG. 1, and FIGS. 8 to 10 are flowcharts showing the operation sequence of the communication device shown in FIG. 2.

Figure 8:
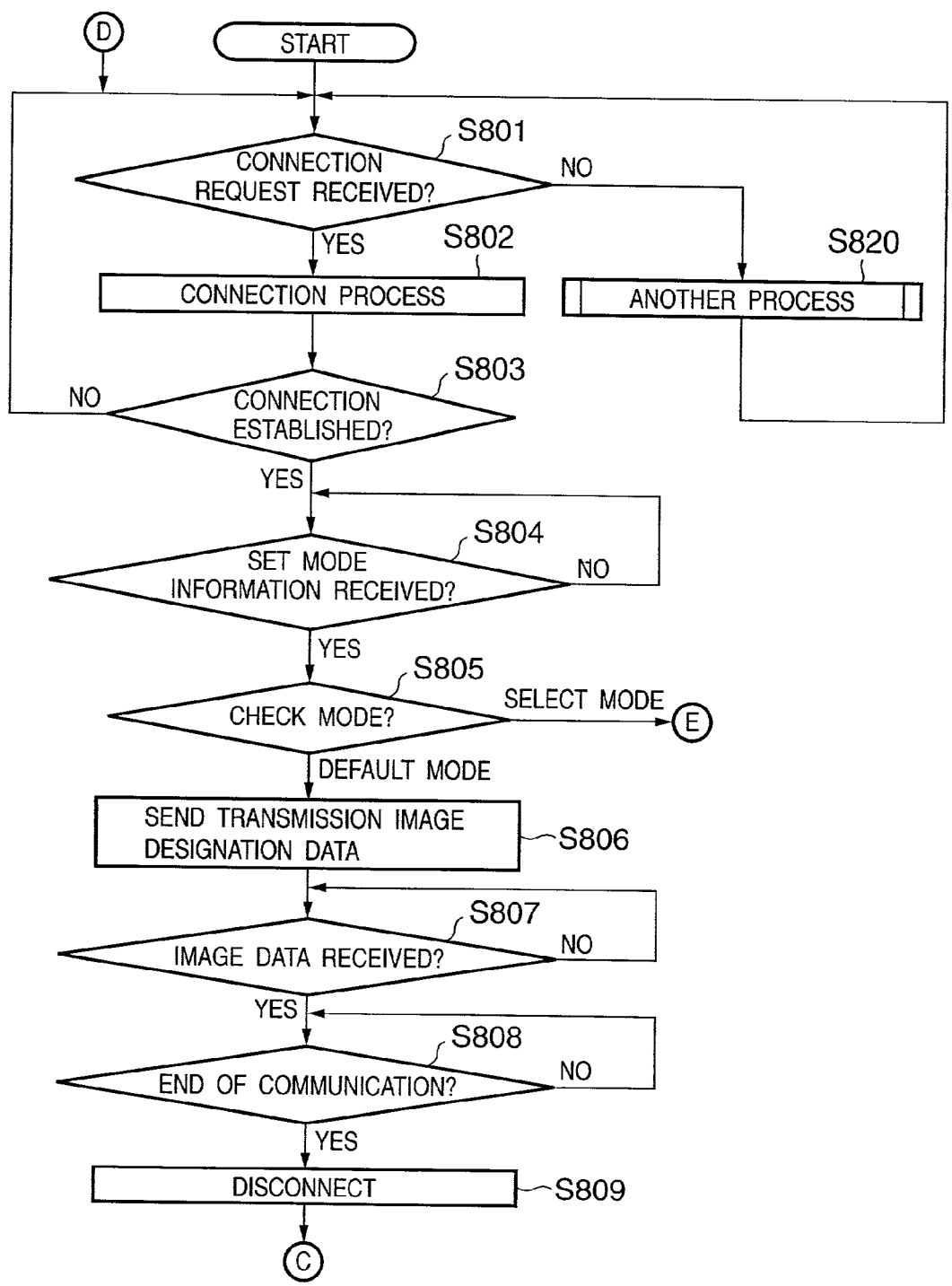
FIG. 8 is a flowchart showing the operation sequence in the communication device shown in FIG. 2.
Figure 9:
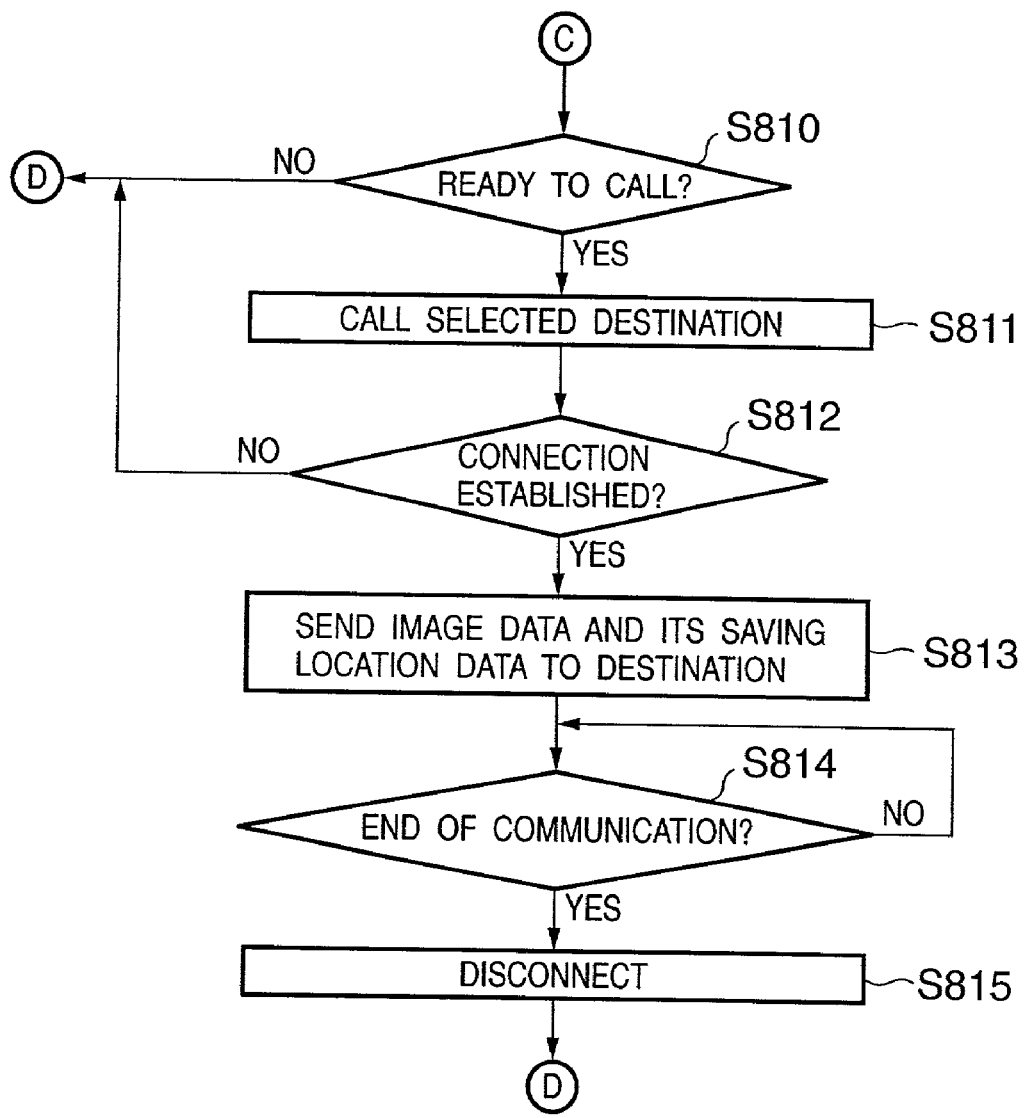
FIG. 9 is a flowchart showing the operation sequence in the communication device shown in FIG. 2.
Figure 10:
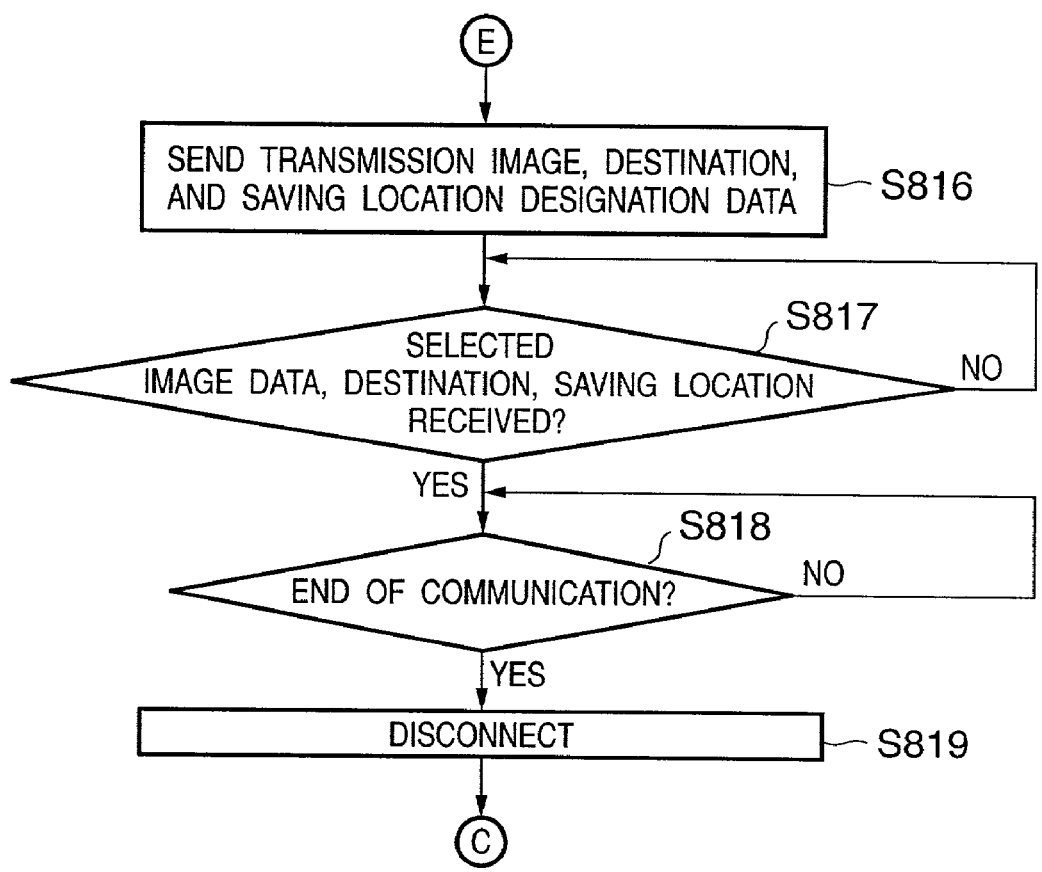
FIG. 10 is a flowchart showing the operation sequence in the communication device shown in FIG. 2.

The sequence shown in FIGS. 6 and 7 is executed under the control of the system control circuit 50, and the sequence shown in FIGS. 8 to 10 is executed under the control of the communication system control circuit 350.

FIGS. 6 and 7 show the program steps stored in the memory 52 shown in FIG. 1, and the system control circuit 50 is a computer for reading out the programs from the memory 52 and executing the readout programs. The memory 52 is a storage medium which stores the programs so that the system control circuit 50 can read them out. When the programs are stored in a card type storage medium and the system control circuit 50 reads out the programs via the connector 127 and interface 128, the card type storage medium that stores the programs correspond to the storage medium which stores the programs so that the system control circuit 50 can read them out. The programs may be externally supplied to the system control circuit 50 via the antenna 112 and communication circuit 110.

FIGS. 8 to 10 show the program steps stored in the memory 352 shown in FIG. 2, and the communication system control circuit 350 is a computer for reading out the programs from the memory 352 and executing the readout programs. The memory 352 is a storage medium which stores the programs so that the communication system control circuit 350 can read them out. When the programs are stored in a card type storage medium and the communication system control circuit 350 reads out the programs via the connector 392 and interface 390, the card type storage medium that stores the programs correspond to the storage medium which stores the programs so that the communication system control circuit 350 can read them out. The programs may be externally supplied to the communication system control circuit 350 via the antenna 332 and communication circuit 330 or via the antenna 328 and communication circuit 326.

The operation done by the image sensing device 100 under the control of the system control circuit 50 that executes the programs shown in FIGS. 6 and 7 will be explained below.

In the image sensing device 100, as shown in FIG. 6, when the power switch is turned ON, an initialization process is executed in step S601, and it is then checked in step S602 if an image send key has been pressed. If the image send key has not been pressed, the flow advances to step S615 to execute another process (e.g. an image sensing process or an image playback process), and the flow advances to step S614 to check if the power switch is turned OFF. If the power switch is turned off, the processing ends; otherwise, the flow returns to step S602.

If it is detected in step S602 that the image send key has been pressed, the flow advances to step S603 to execute a mode setup process. In this mode setup process, one of the default mode and select mode is set as the image transmission mode using the console 70.

In the default mode, an image is sent using destination information, image saving location information, and transmission image designation information which are fixed as default conditions. In the select mode, destination information, image saving location information, and transmission image designation information are selected from the image sensing device 100, and an image is sent using the selected information.

The flow advances to step S604 to execute a device detection process for detecting a device with which the image sensing device can communicate via the communication circuit 110. It is checked on the basis of the detection result of the device detection process in step S605 if a device with which the image sensing device can communicate is detected. If a device with which the image sensing device can communicate is not detected, the flow jumps to step S614; otherwise, the flow advances to step S606.

In step S606, a connection process for establishing wireless connection with the detected device is executed. In this case, the detected device is the communication device 300, and the connection process with the communication device 300 is executed. It is checked in step S607 if connection with the communication device 300 is established. If connection is not established, the flow jumps to step S614; otherwise, the flow advances to step S608 to discriminate if the default or select mode is set.

If the default mode is set, the flow advances to step S609 to send set mode information indicating that the default mode is set to the communication device 300 via the communication circuit 110. In step S610, the control waits for reception of image designation data returned from the image communication device 300 in response to the set mode information, i.e., transmission image designation information fixed by default (in the example in FIG. 5, information that designates image data corresponding to image_0.jpg stored at address "80" of the nonvolatile memory 354 if information stored at address "88" of the nonvolatile memory 354 is "10").

When the communication circuit 110 receives the transmission image designation information fixed as a default, the flow advances to step S611 to read out image data designated by the transmission image designation information (image data corresponding to image_0.jpg when image data corresponding to it is designated) from the storage medium 120. In step S612, the readout image data is sent to the communication device 300 via the communication circuit 110. The flow advances to step S613 to disconnect wireless connection with the communication device 300. The flow then advances to step S614.

In the default mode, the latest sensed image can be designated as a transmission image. This designation can be implemented by registering information "00" at address "88" of the nonvolatile memory 56. Upon receiving information that designates the latest sensed image as a transmission image by the communication circuit 110, the image sensing device 100 sends the latest sensed image stored in the recording unit 122 to the communication device 300 via the communication circuit 110.

If it is determined in step S608 that the select mode is set, the flow jumps to step S616 shown in FIG. 7.

In step S616, set mode information indicating that the select mode is set is sent to the communication device 300 via the communication circuit 110. In step S617, the control waits for reception of transmission image, destination, and saving location designation data returned from the communication device 300 in response to the set mode information, i.e., all of transmission image designation information, destination information, and image saving location designation information (in the example of FIG. 5, all pieces of information stored at addresses "0", "1", "2", "3", "40", "41", "42", "43", "80", "81", "82", and "83" of the nonvolatile memory 354).

Upon receiving all of the transmission image designation information, destination information, and image saving location designation information by the communication circuit 110, the flow advances to step S618 to display a transmission image selection screen on the image display 28. This transmission image selection screen displays a list of information, e.g., image file names corresponding to respective pieces of received transmission image designation information (in the example of FIG. 5, image_0.jpg, image_1.jpg, image_2.jpg, and image_3.jpg), and the user can designate image data to be sent by selecting a desired file name from those displayed in the list using the console 70. In step S619, the control waits for completion of operation for selecting image data to be sent. Upon completion of this operation, information indicating the selected image data is held in the memory 30, and the flow then advances to step S620.

In step S620, a destination selection screen is displayed on the image display 28. The destination selection screen displays information corresponding to the received destination information, e.g., a list of telephone numbers (in the example of FIG. 5, 0337571234, 0354827234, 0441234567, and 070512345678), and the user can designate a destination by selecting a desired telephone number from those displayed in the list using the console 70. The control waits for completion of operation for selecting the destination in step S621. Upon completion of this operation, destination information corresponding to the selected telephone number is held in the memory 30, and the flow then advances to step S622.

In step S622, a saving location selection screen is displayed on the image display 28. The saving location selection screen displays a list of information corresponding to the received image saving location information (classes 1, 2, 3, and 4 in an image folder in My Documents shown in FIG. 5), and the user can designate an image saving location in the destination (the reception terminal 500 in FIG. 4) by selecting desired information from those in the list using the console 70. The control waits for completion of operation for selecting the image saving location in step S623. Upon completion of this operation, the selected image saving location information is held in the memory 30, and the flow advances to step S624.

Image data designated by the transmission image designation information held in the memory 30 is read out from the storage medium 120 in step S624, and the readout image data, and the destination information and image saving location information held in the memory 30 are sent to the communication device 300 via the communication circuit 110 in step S625. The flow then advances to step S613 shown in FIG. 6 to disconnect wireless connection with the communication device 300. The flow advances to step S614.

The operation done by the communication device 300 under the control of the communication system control circuit 350 that executes the programs shown in FIGS. 8 to 10 will be explained below.

In the communication device 300, as shown in FIG. 8, it is checked in step S801 if the communication circuit 330 has received a connection request from the image sensing device 100. If the communication circuit 330 has not received any connection request yet, the flow advances to step S820 to execute another process, and the flow returns to step S801.

Upon receiving the connection request from the image sensing device 100, the flow advances to step S802 to execute a connection process for establishing wireless connection with the image sensing device 100 via the communication circuit 330. It is checked in step S803 if connection is established. If connection is not established, the flow returns to step S801. If connection is established, the communication device 300 is ready to communicate with the image sensing device 100 via a wireless channel, and waits for reception of set mode information from the image sensing device 100 in step S804. Upon receiving the set mode information by the communication circuit 330, the flow advances to step S805.

It is checked, based on the received set mode information in step S805, if the default mode or select mode is set at the image sensing device 100. If the default mode is set at the image sensing device 100, the flow advances to step S806 to send transmission image designation data, i.e., transmission image designation information fixed as a default (in the example in FIG. 5, information for designating image_0.jpg stored at address "80" if information stored at address "88" of the nonvolatile memory 354 is "10") via the communication circuit 330.

The flow then advances to step S807 to wait for reception of image data sent from the image sensing device 100 (image data designated by the transmission image designation information fixed as a default, and image data corresponding to image_0.jpg stored at address "80" if information stored at address "88" of the nonvolatile memory 354 is "10" in the example in FIG. 5) via the communication circuit 330. Upon receiving this image data by the communication circuit 330, the received image data is stored in the memory 352 or recording unit 202, and the flow advances to step S808 to wait for completion of the communication with the image sensing device 100. Upon completion of the communication, disconnection of wireless connection with the image sensing device 100 is confirmed in step S809, and the flow advances to step S810 in FIG. 9.

When information "00" is stored at address "88" of the nonvolatile memory 354, the latest sensed image is designated as the transmission image.

It is checked in step S810 if the communication circuit 326 can originate a call to the communication network 400. If the communication circuit 326 cannot originate a call, the flow returns to step S801. If the communication circuit 326 can originate a call, the flow advances to step S811 to call the designated destination via the communication circuit 326. In this case, since the default mode is set, a call is placed to a destination designated by the destination information fixed as a default. In the example in FIG. 5, since a number at address "0" is set as a default destination at address "8" of the nonvolatile memory 354, a call is placed to a destination having a telephone number "0337571234" at address "0". This call originating signal is sent from the communication circuit 326 to a base station of the communication network 400 shown in FIG. 4.

It is checked in step S812 if connection with the destination is established. If connection is not established, the flow returns to step S801. If connection is established, the flow advances to step S813 to send image data and its saving location data (i.e., image saving location information fixed as a default) to the destination (reception terminal 500 in FIG. 4) via the communication circuit 326. This image data and saving location data is sent to the reception terminal 500 via the base station of the communication network 400 (FIG. 4) and the communication network 400. In the example in FIG. 5, since zero is set at address "48" of the nonvolatile memory 354, the default saving location is a class 1 folder in the image folder in My Documents stored at address "40". Also, an image sent from the communication circuit 326 to the partner via the communication network 400 is the image received in step S807.

The flow advances to step S814 to wait for completion of the communication with the destination. Upon completion of the communication, the flow advances to step S815 to disconnect connection with the destination, and the flow returns to step S801.

If it is determined in step S805 that the select mode is set, the flow advances to step S816 shown in FIG. 10. In step S816, since the select mode is set, transmission image, destination, and saving location designation data, i.e., transmission image designation information, destination information, and image saving location information (all pieces of information stored at addresses "0", "1", "2", "3", "40", "41", "42", "43", "80", "81", "82", and "83" of the nonvolatile memory 354) are read out and are sent to the image sensing device 100 via the communication circuit 330.

In step S817, the control waits for reception of image data, destination information, and image saving location information sent from the image sensing device 100 via the communication circuit 330. Upon receiving these data and information, the received information is stored in the memory 352 or recording unit 202, and the flow advances to step S818 to wait for completion of the communication with the image sensing device 100. Upon completion of the communication with the image sensing device 100, disconnection of wireless connection with the image sensing device 100 is confirmed in step S819, and the flow then advances to step S810 in FIG. 9.

It is checked in step S810 if the communication circuit 326 can originate a call to the communication network 400. If the communication circuit 326 cannot originate a call, the flow returns to step S801. If the communication circuit 326 can originate a call, the flow advances to step S811 to call the designated destination via the communication circuit

326. In this case, since the select mode is set, a call is placed to the destination designated by the destination information received in step S817. In the example shown in FIG. 5, a call is placed to a destination having a telephone number selected from those at addresses "0" to "3".

It is checked in step S812 if connection with the destination is established. If connection is not established, the flow returns to step S801. If connection is established, the flow advances to step S813 to send image data and its saving location data (i.e., image saving location information selected by the image sensing device 100 from those at addresses "40" to "43") to the destination (reception terminal 500 in FIG. 4) via the communication circuit 326. The image sent from the communication circuit 326 to the partner via the communication network 400 is that received in step S817 and, likewise, the saving location data is that received in step S817.

The reception terminal 500 saves the received image in the designated folder of classes 1 to 4 contained in the image folder in My Documents of its storage areas.

The flow advances to step S814 to wait for completion of the communication with the destination. Upon completion of the communication, the flow advances to step S815 to disconnect with the destination, and the flow returns to step S801.

In FIGS. 6 to 10, the disconnection timing of wireless connection between the image sensing device 100 and communication device 300 is the completion timing of the communication between them. However, connection may be terminated at other possible timings and resending image data due to a communication error, upon successively transferring a plurality of image files, or upon successively transferring image data to different partners.

A data transfer method according to the second embodiment of the present invention will be described below with reference to FIG. 11. Since a system which practices the data transfer method is constructed by the image sensing device 100, communication device 300, and public network as in the first embodiment, a description thereof will be omitted.

Figure 11:
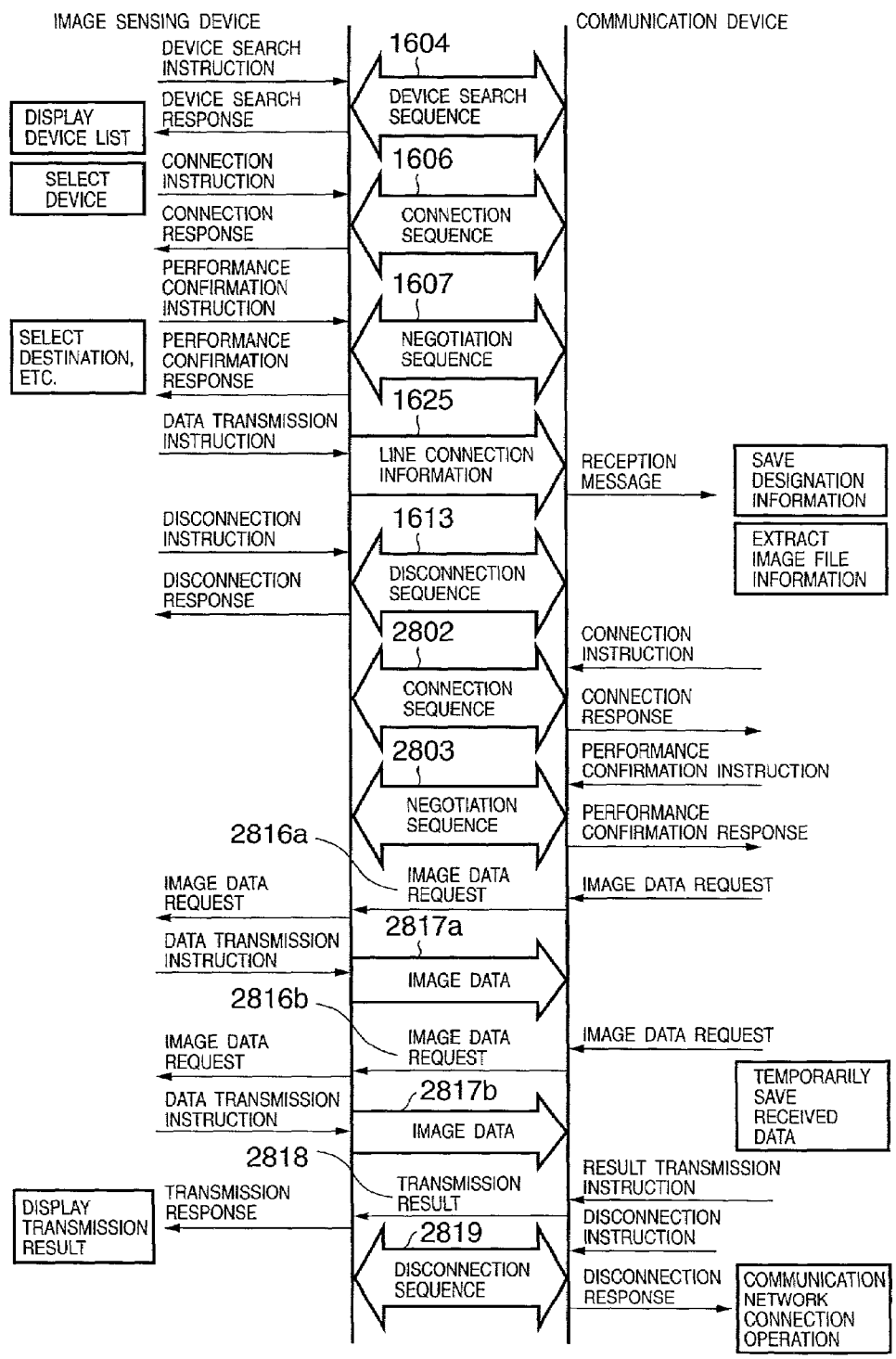
FIG. 11 is a communication sequence chart of an image communication system according to the second embodiment.

FIG. 11 is a sequence chart showing wireless communication control in the image sensing device 100 and communication device 300, which practice the data transfer method according to the second embodiment.

In the second embodiment, the image sensing device 100 saves destination designation information for designating a destination to which image data sensed by the image sensing device 100 is to be sent, and transmission image designation information for designating image data to be sent to the destination as a designation information file such as DPOF (Digital Print Order Format) or the like, and transfers the saved designation information file to the communication device 300 via a wireless communication using the communication circuit 110. The communication device 300 saves the transferred designation information file, extracts a file name of image data to be transferred from the designation information, and reads out image data at an arbitrary timing. In this embodiment, image data can be acquired from the image sensing device in correspondence with the operation state of the communication device 300, and any image transfer failure caused by a busy state of the communication device can be avoided.

The principal process of the image data transfer operation between the image sensing device 100 and communication device 300 will be explained below.

Referring to FIG. 11, the image sensing device 100 executes an initialization process, and then checks if the image send key has been pressed. If the image send key has been pressed, a mode setup process is executed. In this mode setup process, one of the default mode and select mode is set as the image transmission mode.

In the default mode, an image is sent using fixed destination information, image saving location information, and transmission image designation information which are set in advance. In the select mode, destination information, image saving location information, and transmission image designation information are selected from the image sensing device 100, and an image is sent using the selected information. In accordance with the selected mode, information set in advance or edited information is saved in a designation information file.

A device detection process 1604 for detecting a device with which the image sensing device can communicate via the communication circuit 110 is executed (step S604). If a device with which the image sensing device can communicate is detected (step S605), a connection process 1606 for establishing wireless connection with a selected one of the detected devices is executed (step S606). In this case, the detected device is the communication device 300, and the connection process with the communication device 300 is executed. If connection is established in the lower layer, a host protocol 1607 checks performance. If the sequence of the present invention is installed in both the apparatus in the host protocol, connection is established (step S607).

When connection is established, if the select mode is set (step S608), the host protocol 1607 sends set mode information indicating that the select mode is set from the communication circuit 110 to the communication device 300 (step S616), and the communication circuit 110 receives transmission image, destination, and saving location designation data from the communication device 300 (step S617). After that the processes in steps S606 to S623 are executed to select a transmission image, destination, and saving location.

In this embodiment, a designation information file transmission process 1625 is executed in place of the processes in steps S624 and S625. Upon completion of transfer of this designation information file, the communication device 300 saves the designation information, and a disconnection sequence 1613 for disconnecting wireless connection between the image sensing device 100 and communication device 300 is executed (step S613).

In this embodiment, the designation information file contains information for designating a transmission image from image data sensed by the image sensing device 100, information for designating a destination to which image data is sent via the communication device 300, and information for designating the saving location of the sent image data. The information for designating the transmission image indicates a file name of the transmission image, and the designation information file does not contain any image data. Alternatively, the designation information file may contain a thumbnail as image data with a small data size. In the embodiment of the present invention, the communication device 300 displays the received thumbnail on the display 324.

If it is determined in step S608 that the default mode is set, a transmission sequence 1625 of a designation information file containing information indicating the default mode from the communication circuit 110 to the communication device 300 is executed, and the disconnection sequence 1613 for disconnecting the wireless connection between the image sensing device 100 and communication device 300 is executed, in place of steps S609 to S612 (step S613).

On the other hand, upon receiving a connection request (step S801), the communication device 300 executes a connection process 1606 (step S802). When connection is established, if the image sensing device 100 is set in the select mode, the host protocol 1607 receives the set mode information indicating the selected mode from the image sensing device (steps S804 and S805). The host protocol 1607 sends transmission image, destination, and saving location designation data from the communication circuit 330 to the image sensing device 100 (step S816), and the communication circuit 330 receives the designation information file of the selected mode from the image sensing device 100 and saves it in the memory 362 (step S817). Upon completion of the connection with the image sensing device 100 (step S818), the disconnection sequence 1613 for disconnecting with the image sensing device 100 is executed (step S819).

If it is determined in step S804 that the image sensing device 100 is in the default mode, the default mode designation information file is received, and is saved in the memory 352 (step S805). In this embodiment, image data reception in steps S806 and S807 is skipped, and upon completion of the communication (step S808), a disconnection sequence 1613 for disconnecting with the image sensing device 100 is executed (step S809).

In the communication device 300 that saves the designation information file, it is checked if the designation information file contains a connection request from the image sensing device 100. If no connection request is received, another process (e.g. the standby process for an incoming call from the communication network 400) is executed.

If it is determined that the designation information file contains the connection request from the image sensing device 100, a connection process 2802 for establishing wireless connection with the image sensing device 100 via the communication circuit 330 is executed. If connection is established in a sequence 2803 which is the same as that aforementioned sequence, the communication device 300 is ready to communicate with the image sensing device 100 via a wireless channel.

When the image sensing device 100 is set in the select mode, since the saved designation information file contains transmission image designation information, the transmission image designation information is read out, image data is designated based on the transmission image designation information, image data requests 2816a, b, . . . are issued to the image sensing device 100, and image data 2817a, b, . . . segmented into a plurality of packets are acquired from the image sensing device 100. Hence, the image data requests 2816a, b, . . . are repetitively sent until reception of image data is completed. The received image data is stored in the memory 352 or recording unit 202. Upon completion of reception of the image data, information 2818 indicating if reception has ended normally is sent to the image sensing device 100.

When the image sensing device 100 is set in the default mode, since the saved designation information file contains information indicating the default mode, image data requests 2816a, b, . . . that request an image of a file name registered at address "88" of the nonvolatile memory 354 (in the example of FIG. 5, image data with a file name "image_0.jpg" stored at address "80" of the nonvolatile memory 354 if "10" is stored at address "88") is sent from the communication circuit 330 to the image sensing device 100 to receive that image data 2817a, b, . . . segmented into a plurality of packets. Hence, the image data requests 2816a, b, . . . are repetitively sent until reception of image data is completed. The received image data is stored in the memory 352 or recording unit 202. Upon completion of reception of the image data, information 2818 indicating if reception has ended normally is sent to the image sensing device 100.

Upon receiving the image data acquisition requests 2816a, b, . . . , the image sensing device 100 reads out the designated image from the storage medium 120, and sends the readout image data to the communication device 300 via the communication circuit 110. This sequence is repeated until all designated image data are transferred to the communication device 300. When the communication device 300 acquires all image data, a disconnection sequence 2819 for disconnecting the wireless connection between the image sensing device 100 and communication device 300 is executed.

Upon completion of the communication of image data with the image sensing device 100, the communication device 300 executes the disconnection sequence 2819 for releasing the wireless channel with the image sensing device 100 irrespective of the mode selected (default or select mode). As in FIG. 9, it is checked if the communication device 300 can place a call to the communication network 400 (step S810). If a call can be placed, the communication circuit 326 calls the destination selected by the image sensing device 100 or a default destination stored at address "8" of the nonvolatile memory 354 (step S811). It is then checked if connection with the destination is established (step S812). If connection is established, image data received from the image sensing device 100 and the saving location data selected by the image sensing device 100 or default saving location data stored at address "48" of the nonvolatile memory 354 are sent to the destination via the communication circuit 326. The destination stores the received image data in a file specified by the saving location data.

The control then waits for completion of the communication with the destination (step S814). Upon completion of this communication, connection with the destination is disconnected (step S815), thus ending a series of operations.

After the communication device 300 receives the designation information file, it may be checked if that file contains the connection request, while maintaining wireless connection, and image data may be acquired as needed.

For the same reason as above, when the size of image data designated by the image sensing device 100 is large, image data may be transferred via wireless connection and via a communication with the communication network 400 according to the connection request, at the same time.

In the first and second embodiments, since the image sensing device 100 designates image data to be sent via the communication network 400 using transmission image designation information held by the communication device 300, and sends the designated image data to a destination designated by the destination information via the communication device 300, sensed image data can be easily sent to a desired destination via the communication network 400.

Since the saving location of the sent image data can be designated by the image saving location information, the receiving side can easily classify and search received images.

Since the default mode and select mode can be selectively set, a freedom in use according to user's needs can be provided.

As a storage medium for supplying the program code of software that implements the functions of the above embodiments (including the flow charts shown in FIGS. 6 to 10), for example, a floppy disk, hard disk, optical disk, magnetooptical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image sensing device comprising:
   wireless communication means for performing wireless communication with a communication device, transmitting to the communication device a mode selection signal for selecting a mode and receiving data of a plurality of destinations from the communication device; and
   selection means for selecting, in a selection mode which is selected by the mode selection signal, one of the plurality of destinations from the data received from the communication device;
   wherein said wireless communication means transmits transmission data and destination data of the destination selected from among the plurality of destinations by said selection means, and transmits the transmission data to be transmitted to a default destination in a default mode selected by the mode selection signal.

2. A device according to claim 1, wherein said wireless communication means requests the communication device to send transmission data to the destination selected from among of the plurality of destinations by said selection means.

3. A device according to claim 1, wherein said selection means selects from a list of saving locations received by said wireless communication means a location where the destination of the transmission data saves the transmission data.

4. A device according to claim 1, wherein said selection means selects the destination from among the plurality of destinations of the transmission designated by designation data received by said wireless communication means.

5. A method of controlling an image sensing device, said method comprising the steps of:
   performing wireless communication with a communication device, transmitting to the communication device a mode selection signal for selecting a mode and receiving data of a plurality of destinations from the communication device; and
   selecting, in a selection mode which is selected by the mode selection signal, one of the plurality of destinations from the data received from the communication device,
   wherein said wireless communication step transmits transmission data and destination data of the destination selected in said selecting step from among the plurality of destinations, and transmits the transmission data to be transmitted to a default destination in a default mode selected by the mode selection signal.

6. A method according to claim 5, wherein said wireless communication step includes the step of requesting the communication device to send the transmission data to the destination selected in said selecting step from among the plurality of destinations.

7. A computer-readable storage medium storing a computer program for an image sensing device said computer program comprising:
   code for performing wireless communication with a communication device, transmitting a mode selection signal for selecting a mode to the communication device and receiving data of a plurality of destinations from the communication device; and
   code for selecting, in a selection mode which is selected by the mode selection signal, one of the plurality of destinations from the data received from the communication device,
   wherein said code for wireless communication transmits transmission data and destination data of the destination selected by said selecting code from among the plurality of destinations, and transmits the transmission data to be transmitted to a default destination in a default mode selected by the mode selection signal.

8. A storage medium according to claim 7, wherein said wireless communication code includes code for requesting the communication device to send transmission data to the destination selected by said selecting code from among the plurality of destinations.

9. A communication device comprising:
   storage means for storing data of a plurality of destinations including a default destination;
   wireless communication means for performing wireless communication, said wireless communication means receives a mode selection signal from a data communication device, sends the data of the plurality of destinations to the data communication device, and receives transmission data and destination data of a destination from the data communication device in a selection mode which is selected by the mode selection signal; and
   transmission means for transmitting the transmission data received by said wireless communication means to the destination corresponding to the destination data in the selection mode, and transmitting the transmission data received by said wireless communication means to the default destination in a default mode selected by the mode selection signal.

10. A device according to claim 9, wherein said transmission means transmits the transmission data to the destination via a base station of a communication network.

11. A device according to claim 9, wherein said wireless communication means sends a list of saving locations to the data communication device and receives location data of a saving location from the data communication device, and said transmission means transmits the location data received from the data communication device.

12. A device according to claim 9, wherein said wireless communication means sends image designation data to the data communication device for designating image data to be sent.

13. A communication method comprising the steps of:
   performing wireless communication, said wireless communication step includes the steps of receiving a mode selection signal from a data communication device, sending data of a plurality of destinations to the data communication device, and receiving transmission data and destination data of a destination from the data communication device in a selection mode which is selected by the mode selection signal;

sending the transmission data received in said wireless communication step to the destination corresponding to the destination data in the selection mode; and sending the transmission data received in said wireless communication step to a default destination in a default mode selected by the mode selection signal.

14. A method according to claim 13, wherein said wireless communication step includes the steps of sending a list of saving locations to the data communication device, and receiving location data of a saving location from the data communication device, and wherein said step of sending the transmission data in the selection mode includes the step of sending the location data received from the data communication device.

15. A computer-readable storage medium storing a computer program said program comprising:

code for performing wireless communication, said code for wireless communication includes code for receiving a mode selection signal from a data communication device, code for sending data of a plurality of destinations to the data communication device, and code for receiving transmission data and destination data of a destination from the data communication device in a selection mode which is selected by the mode selection signal;

code for sending the transmission data received by said code for wireless communication to the destination corresponding to the destination data in the selection mode; and code for sending the transmission data received by said code for wireless communication to a default destination in a default mode selected by the mode selection signal.

16. A storage medium according to claim 15, wherein said code for wireless communication includes code for sending a list of saving locations to the data communication device, and code for receiving location data of a saving location from the data communication device, and wherein said code for sending the transmission data in the selection mode includes code for sending the location data received from the data communication device.

17. A communication apparatus comprising:

storage means for storing data of a plurality of destinations including a default destination;

communication means for performing communication, said communication means receives a mode selection signal from a data communication device, sends the data of the plurality of destinations to the data communication device, and receives transmission data and destination data of a destination from the data communication device in a selection mode which is selected by the mode selection signal; and wireless transmission means for transmitting the transmission data received by said communication means to the destination corresponding to the destination data in the selection mode, and transmitting the transmission data received by said communication means to the default destination in a default mode selected by the mode selection signal.

18. An apparatus according to claim 17, wherein said wireless transmission means transmits the transmission data to the destination via a base station of a wireless communication network.

19. An apparatus according to claim 17, wherein said communication means sends a list of saving locations to the data communication device and receives location data of a saving location from the data communication device, and said wireless transmission means transmits the location data received from the data communication device.

20. A communication method comprising the steps of:

receiving a mode selection signal from a data communication device;

sending data of a plurality of destinations to the data communication device;

receiving transmission data and destination data of one of the plurality of destinations from the data communication device in a selection mode which is selected by the mode selection signal;

sending the transmission data received in said receiving transmission data and destination data step to the destination corresponding to the destination data in the selection mode; and sending the transmission data received in said receiving transmission data and destination data step to a default destination by wireless communication in a default mode selected by the mode selection signal.

21. A method according to claim 20, wherein said receiving transmission data and destination data step includes the steps of sending a list of saving locations to the data communication device, and receiving location data of a saving location from the data communication device, and wherein said step of sending the transmission data in the selection mode includes the step of sending the location data received from the data communication device.

22. A computer-readable storage medium storing a computer program comprising:

code for receiving a mode selection signal from a data communication device;

code for sending data of a plurality of destinations to the data communication device;

code for receiving transmission data and destination data of one of the plurality of destinations from the data communication device in a selection mode which is selected by the mode selection signal;

code for sending the transmission data received by said code for receiving transmission data and destination data to the destination corresponding to the destination data in the selection mode; and code for sending the transmission data received by said code for receiving transmission data and destination data to a default destination by wireless communication in a default mode selected by the mode selection signal.

23. A storage medium according to claim 22, wherein said code for receiving transmission data and destination data includes code for sending a list of saving locations to the data communication device, and receiving location data of a saving location from the data communication device, and wherein said code for sending the transmission data in the selection mode includes code for sending the location data received from the data communication device.

24. A communication apparatus comprising:

storage means for storing data of a plurality of destinations;

communication means for performing communication, wherein said communication means sends the data of the plurality of destinations to a data communication device, receives designation data for designating transmission data and a destination of the transmission data from the data communication device, and requests the transmission data of the data communication device, which is designated by the designation data; and transmission means for transmitting the transmission data requested by said communication means and obtained from the data communication device, to the destination of the transmission data, wherein said communication means disconnects connection with the data communication device after receiving the designation data and reconnects with the data communication device before requesting the transmission data.

25. An apparatus according to claim 24, wherein said communication means sends data of a plurality of saving locations to the data communication device and receives data of one of the plurality of saving locations from the data communication device, and said transmission means transmits the data of the one of the plurality of saving locations to the destination of the transmission data.

26. An apparatus according to claim 24, wherein said transmission means transmits the transmission data to the destination of the transmission data via a radio network.

27. A communication method comprising the steps of:
sending data of a plurality of destinations to a data communication device;
receiving designation data for designating transmission data and destination of the transmission data from the data communication device;
requesting the transmission data of the data communication device, which is designated by the designation data;
transmitting the transmission data requested in said requesting step and obtained from the data communication device, to the destination of the transmission data; and
disconnecting connection with the data communication device after receiving the designation data and reconnecting with the data communication device before requesting the transmission data.

28. A method according to claim 26, further comprising the steps of sending data of a plurality of saving locations to the data communication device, receiving data of one of the plurality of saving locations from the data communication device, and transmitting the data of the one of the plurality of saving locations to the destination of the transmission data.

29. A method according to claim 27, wherein said transmission step transmits the transmission data to the destination of the transmission data via a radio network.

30. A computer-readable storage storing a computer program comprising:
code for sending data of a plurality of destinations to a data communication device;
code for receiving designation data for designating transmission data and destination of the transmission data from the data communication device;
code for requesting the transmission data of the data communication device, which is designated by the designation data;
code for transmitting the transmission data requested by said requesting code and obtained from the data communication device, to the destination of the transmission data; and
code for disconnecting connection with the data communication device after receiving the designation data and reconnecting with the data communication device before requesting the transmission data.

31. A storage medium according to claim 30, further comprising code for sending data of a plurality of saving locations to the data communication device, code for receiving data of one of the plurality of saving locations from the data communication device, and code for transmitting the data of the one of the plurality of saving locations to the destination of the transmission data.

32. A storage medium according to claim 30, wherein said transmitting code transmits the transmission data to the destination of the transmission data via a radio network.

* * * * *

UNITED STATES PATENT AND TRADEMARK OFFICE
CERTIFICATE OF CORRECTION

| | | |
|---|---|---|
| PATENT NO. | : 7,129,972 B2 | Page 1 of 1 |
| APPLICATION NO. | : 09/956023 | |
| DATED | : October 31, 2006 | |
| INVENTOR(S) | : Koichi Mizutani | |

It is certified that error appears in the above-identified patent and that said Letters Patent is hereby corrected as shown below:

COLUMN 3:

Line 27, "are" should read --is--.

COLUMN 5:

Line 35, "receive" should read --receives--.

COLUMN 15:

Line 41, "of" (1st occurrence) should be deleted.

COLUMN 16:

Line 7, "device" should read --device,--.

COLUMN 19:

Line 40, "claim 26," should read --claim 27,--.

Signed and Sealed this

Twenty-eighth Day of August, 2007

JON W. DUDAS
*Director of the United States Patent and Trademark Office*